United States Patent

Schnyder et al.

[11] Patent Number: 5,111,566
[45] Date of Patent: May 12, 1992

[54] CONTROLLED DEFLECTION ROLL

[75] Inventors: Eugen Schnyder, Waltenschwil; Rolf Lehmann, Rudolfstetten, both of Switzerland

[73] Assignee: Sulzer Escher Wyss AG, Zurich, Switzerland

[21] Appl. No.: 710,016

[22] Filed: Jun. 4, 1991

[30] Foreign Application Priority Data

Jun. 25, 1990 [CH] Switzerland .............. 02113/90

[51] Int. Cl.⁵ ................................ B21B 13/02
[52] U.S. Cl. .................. 29/116.2; 29/113.2; 29/116.1
[58] Field of Search .......... 29/113.1, 113.2, 116.1, 29/116.2, 895.1, 895.23

[56] References Cited

U.S. PATENT DOCUMENTS

| | | | |
|---|---|---|---|
| 2,591,612 | 4/1952 | Rowe et al. | 29/116.1 X |
| 3,703,862 | 11/1972 | Appenzeller | 29/113.2 X |
| 3,802,044 | 4/1974 | Spillmann et al. | 29/113.2 |
| 3,885,283 | 5/1975 | Biondetti | 29/116.2 |
| 3,919,753 | 11/1975 | Lehmann et al. | 29/116.2 |
| 4,612,692 | 9/1986 | Molinatto | 29/116.2 |
| 4,685,182 | 8/1987 | Lübke | 29/116.1 |

*Primary Examiner*—Timothy V. Eley
*Assistant Examiner*—C. Richard Martin
*Attorney, Agent, or Firm*—Sandler, Greenblum & Bernstein

[57] ABSTRACT

In a controlled deflection roll having a roll shell rotatable about a stationary carrier and braced by one or more support elements against the stationary carrier, the roll shell comprises an inner roll shell part and an outer roll shell part which, during operation of the controlled deflection roll, form a press or force fit with respect to one another, for instance, due to excess pressure in the interior of the controlled deflection roll or due to elastic pre-biasing of the parts of the roll shell. Upon pressure relief or the existence of negative pressure within the controlled deflection roll a play or clearance is formed between the outer roll shell part and the inner roll shell part of the roll shell which enables dismantling and exchange of the outer roll shell part of the roll shell without the need to dismantle the controlled deflection roll or to remove such from the machine.

6 Claims, 1 Drawing Sheet

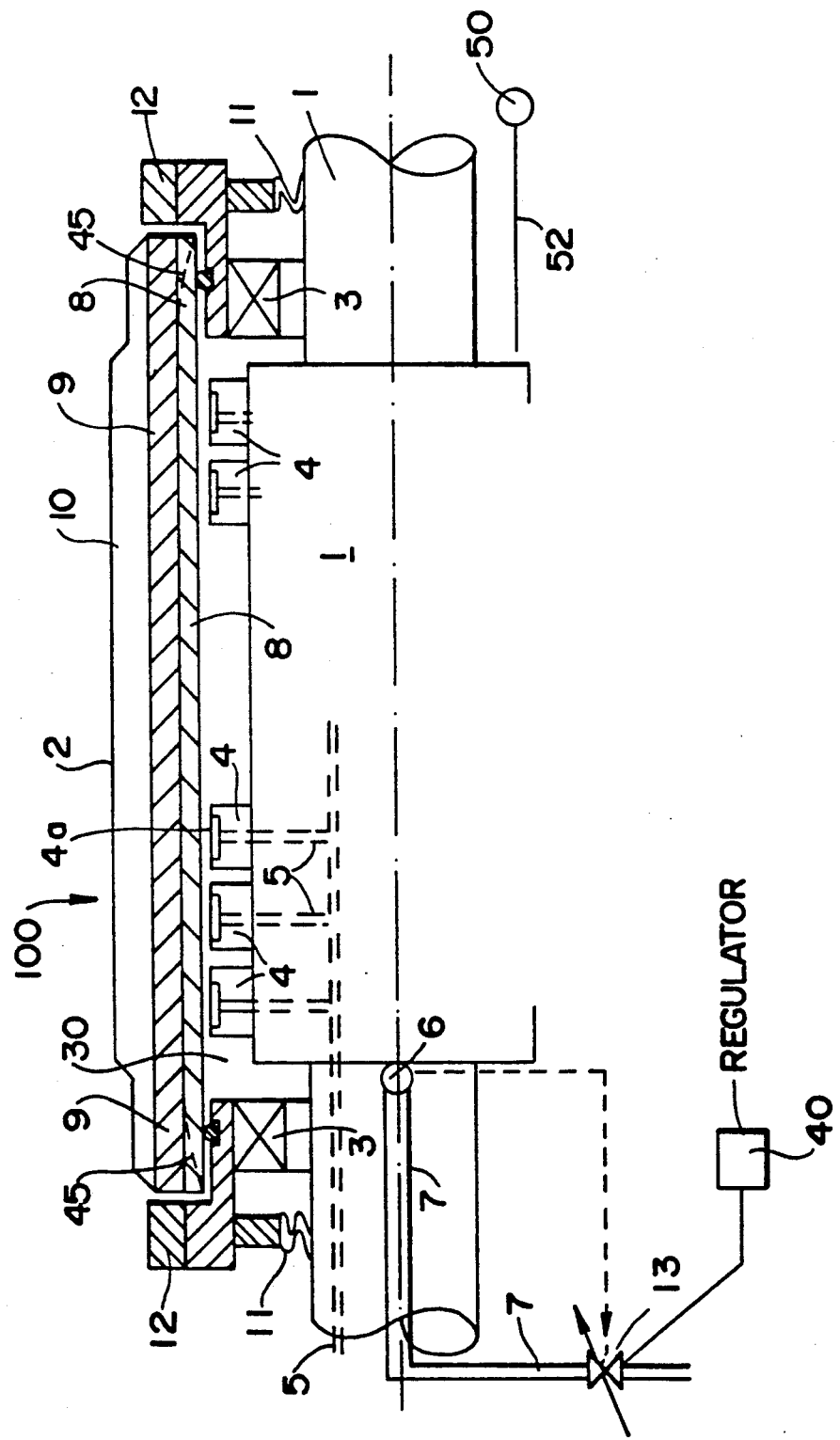

CONTROLLED DEFLECTION ROLL

BACKGROUND OF THE INVENTION

1. Field of the Invention

The present invention relates to a new and improved construction of a controlled deflection roll comprising a roll shell or jacket which is rotatable about a stationary carrier or support, wherein this roll shell or jacket is supported or braced against the stationary carrier or support by means of at least one support or pressure element exerting a pressing force in the support direction of the support or pressure element.

2. Discussion of the Background and Material Information

Such controlled deflection rolls are typically employed for the pressure or pressing treatment of a web which passes through a pressure- or roller apparatus and are known, for instance, from U.S. Pat. No. 3,802,044, granted Apr. 9, 1974, and entitled "CONTROLLED DEFLECTION ROLL".

As described in this patent, the support or pressure elements can be designed as hydrostatic support or pressure elements, or else can be constructed in a different fashion, such as hydrodynamic, pneumatic, magnetic or mechanical, for example, applied by means of spring force, support or pressure elements, or even as pressure cushions or sealed pressure chambers.

At times these controlled deflection rolls are equipped with a so-called cantilever device. With a controlled deflection roll of the aforementioned type, this cantilever device enables exchange of the roll shell or jacket without the need to dismantle the controlled deflection roll out of the machine. Also, in many cases it is necessary to be able to exchange the roll shell or jacket relatively rapidly externally of the machine, especially in order to maintain within limits the number of reserve rolls which must be held in readiness at a roller apparatus or mill.

With prior art rolls it was necessary to expose the internal parts or components, especially the support elements, when exchanging the roll shell or jacket. Hence, the pressurized oil present in the roll, which was released during exchange of the roll shell or jacket, constituted a disturbance. Additionally, the mounting of a new roll shell or jacket upon the support elements of the roll required an undesirable large amount of time, and a considerable expenditure in personnel and equipment, particularly, in order to prevent damage to the seals within the interior of the roll and to accommodate these seals to the new roll shell or jacket as well as to ensure for a sufficiently good and functionally reliable mounting of the new roll shell or jacket upon the support elements.

SUMMARY OF THE INVENTION

Therefore, with the foregoing in mind, it is a primary object of the present invention to provide an improved construction of controlled deflection roll which is not afflicted with the aforementioned shortcomings and drawbacks of the prior art.

Another and more specific object of the present invention aims at the provision of an improved construction of a controlled deflection roll which enables a rapid exchange of the roll shell or jacket thereof, particularly without requiring the dismantling of the controlled deflection roll out of the machine, but also can be undertaken externally of the machine, with the pressurized fluid medium remaining within the controlled deflection roll, without impairment of the functionality of seals and bearings of the controlled deflection roll by virtue of the exchange of the roll shell or jacket, and with a reduction in the amount of time and personnel as well as the equipment required for the roll shell-exchange operation.

Now in order to implement these and still further objects of the present invention, which will become more readily apparent as the description proceeds, the controlled deflection roll of the present development is manifested, among other things, by the features that the roll shell comprises an outer roll shell part and an inner roll shell part. In the operating condition or state of the controlled deflection roll, the outer roll shell part and the inner roll shell part form a press or force fit with one another. In order to be able to exchange the outer roll shell part there can be generated a play between both the outer roll shell part and the inner roll shell part which is sufficient to enable an axial movement of the outer roll shell part in relation to the inner roll shell part. This play allows removal of the outer roll shell part and the mounting of a new outer roll shell part of the roll shell.

The press or force fit required to establish a sufficiently fixed or sturdy interconnection of the inner roll shell part and the outer roll shell part with one another can be realized, for example, by exerting a pressing force from the interior of the controlled deflection roll upon the inner roll shell part, for instance, by applying an hydraulic force, such as by means of a hydraulic medium at an excess or overpressure, or by pneumatic, electro-magnetic or mechanical means, or else, however, by virtue of the inherent elasticity of the inner roll shell part or the outer roll shell part.

According to an advantageous construction of the controlled deflection roll as contemplated by the present invention, an hydraulic pressure can be built-up by means of the pressurized fluid medium which is required in any event for the hydraulic support or pressure elements. This hydraulic pressure then presses the inner roll shell part against the outer roll shell part of the roll shell. In order to be able to produce the necessary excess pressure, the outflow of the pressurized fluid medium from the support elements can be throttled in a suitable manner. For the exchange of the outer roll shell part of the roll shell there is eliminated the throttling of the outflow or discharge of the pressurized fluid medium, so that there is formed an adequate play between both of the roll shell parts which enables removal of the outer roll shell part of the roll shell.

However, it is also possible to achieve a form locking or frictional connection between both parts of the roll shell in that there is pre-biased the inner roll shell part, so that this inner roll shell part, even without the exertion of any forces, produces a sufficient press or force fit with the outer roll shell part of the roll shell. Then, for the purpose of producing the play which is needed for the removal or drawing-off of the outer roll shell part from the inner roll shell part, the interior of the controlled deflection roll is subjected to a negative pressure or vacuum until the outer roll shell part of the roll shell can be easily withdrawn from the inner roll shell part.

In the aforementioned cases, it is only the outer roll shell part, which is subjected to wear, which is exchanged or replaced, whereas the inner roll shell part of the roll shell remains seated upon the stationary or non-rotatable carrier or support. The seals and bearings are not affected during mounting of a new outer roll shell part and the functionality or operability thereof is fully maintained, that is to say, there are not required any new adjustments or settings for these seals and bearings.

BRIEF DESCRIPTION OF THE DRAWING

The invention will be better understood and objects other than those set forth above, will become apparent when consideration is given to the following detailed description thereof. Such description makes reference to the annexed drawing wherein the single figure shows in longitudinal sectional view a controlled deflection roll constructed according to the present invention and which may be equipped, for example, with an hydraulically exerted or applied inner roll shell part or a prebiased inner roll shell part.

DETAILED DESCRIPTION OF THE PREFERRED EMBODIMENTS

Describing now the drawings, it is to be understood that only enough of the construction of the controlled deflection roll 100 has been depicted therein, in order to simplify the illustration, as needed for those skilled in the art to readily understand the underlying principles and concepts of the present invention.

Turning now to the exemplary embodiments of controlled deflection roll 100 depicted in the single figure of the drawing, it will be understood that such controlled deflection roll 100 comprises a non-rotatable or stationary carrier or support 1 about which there is rotatably mounted, by means of suitable roller bearings 3, a roll shell or jacket 2 as is well known in this technology. As to the roller bearings 3, such can be constituted by radially fixed bearings, as disclosed, for instance, in the aforementioned U.S. Pat. No. 3,802,044, or by radially movable bearings which can move at least in the contemplated support direction, for instance as disclosed in U.S. Pat. No. 3,885,283, granted May 27, 1975, and entitled "PRESS ROLL", or by using any other suitable known radial guide structure. Reference may be readily had to these two United States patents and the disclosures of which are incorporated herein by reference.

The roll shell or jacket 2 is supported or braced in relation to the stationary carrier or support 1 in the contemplated support direction by means of support or pressure elements 4 which can be constructed as hydrostatic support or pressure elements as disclosed, for example, in the aforementioned U.S. Pat. No. 3,802,044 or in another known fashion. In this regard, it is remarked there can be also used a single continuous support or pressure element or a series or group of neighboring support or pressure elements extending in the axial direction of the controlled deflection roll 100, as likewise known in the art. The hydrostatic support or pressure elements 4 are supplied in known manner, by means of bores or ducts 5 provided in the stationary carrier or support 1, with a suitable hydraulic pressurized fluid medium, such as water or pressurized oil, and pressed against the inside of the roll shell or jacket 2. The pressurized fluid medium flowing out of the bearing pockets 4a of the hydrostatic support or pressure elements 4 and into the interior or inner compartment 30 of the controlled deflection roll 100 is collected by at least one bore 6 of the stationary carrier or support 1 or equivalent structure and returned to the outside by means of a discharge or outflow line or conduit 7.

As is known in this technology, the hydrostatic or hydraulic support elements 4 can be grouped together into one or more support zones. Equally possible is the use of a control for the support elements 4 for altering the effective working width and the use of countereffective support or retraction elements 4 which are effective in a direction opposite to the normal working or effective direction of the support elements 4.

In the illustrated exemplary embodiments, the roll shell or jacket 2 is composed of at least two roll shell parts, and specifically, an inner roll shell part 8 and an outer roll shell part 9. Depending upon the contemplated use of the controlled deflection roll 100, the outer roll shell part 9, in turn, can be provided with a covering 10 or the like, for example, formed of an elastic material or rubber. The outer roll shell part 9 of the roll shell 2 can be highly flexible, or, however, such can comprise a steel shell or a shell formed in a different known construction. It is advantageous if this outer roll shell part 9 possesses a certain stiffness or rigidity in radial direction. The inner roll shell part 8 is fabricated from a material which can be expanded or enlarged within certain limits. This inner roll shell part 8 of the roll shell 2 should possess a certain flexibility, on the other hand, should have a certain radial stiffness or rigidity, so that the inner roll shell part 8, when expanded, experiences a counter-supporting action. This property can be attained, for example, by means of a plastic tube which has been intentionally fabricated to achieve this purpose, and there can be realized without any difficulty an elastic elongation in the order of 1%.

The outer diameter of the inner roll shell part 8 and the inner diameter of the outer roll shell part 9 of the roll shell 2 are chosen such that without the action of any forces there exists a play or clearance in the order of tenths of a millimeter. With the existence of such play or clearance the outer roll shell part 9 of the roll shell 2 can be easily moved in axial direction, in other words, such outer roll shell part 9 can be readily withdrawn or dismantled from the remainder of the controlled deflection roll 100 and mounted or assembled thereon, as the case may be. During the exchange or replacement of the outer roll shell part 9 which has been subjected to wear, the inner roll shell part 8 remains seated upon the remainder of the controlled deflection roll 100 and ensures for the encapsulation of the pressurized fluid medium within the interior of the controlled deflection roll 100 during the exchange of the outer roll shell part 9 of the roll shell 2. For the sealing of the interior of the controlled deflection roll 100 there are provided at the opposite ends of the controlled deflection roll 100 flexible seals 11 or equivalent sealing structure. The mounted outer roll shell part 9 is secured against axial displacement by a suitable closure or fixation facility provided at each of the opposite ends of the controlled deflection roll 100.

During the operation of the controlled deflection roll 100, an excess or overpressure is formed within the interior of the controlled deflection roll 100. This excess pressure elastically deforms the inner roll shell part 8 of the roll shell 2 and presses such against the outer roll shell part 9. In the presence of an adequate excess pressure within the interior of the controlled deflection roll 100, for example, in the order of 1 to 5 bar, the inner roll shell part 8 elastically deforms to such a degree that this inner roll shell part 8 forms a press or force fit with the outer roll shell part 9 and affords a fixed or sturdy interconnection of these two roll shell parts 8 and 9 with one another and ensures for a positive conjoint rotation of these two roll shell parts 8 and 9 of the roll shell 2.

In order to ensure for the existence of the requisite excess pressure internally of the controlled deflection roll 100, there can be provided, for example, a discharge or outflow valve 13 having a desired throttling action in the discharge line or conduit 7 for the pressurized fluid medium. This throttle discharge valve 13 can be manually set, or there can be provided a suitable regulator or regulation device 40 which controls the throttle discharge valve 13 as a function of the excess pressure measured within the controlled deflection roll 100 and can regulate a predetermined pressure within the interior 30 of the controlled deflection roll 100. Whereas during the normal operation of the controlled deflection roll 100 the excess pressure within the controlled deflection roll 100 ensures for the intended function of the controlled deflection roll 100, following release of the pressure internally of the controlled deflection roll 100 there is again formed a certain play or clearance between the outer roll shell part 9 and the inner roll shell part 8 of the roll shell 2. As a result, the outer roll shell part 9 of the roll shell 2 can be exchanged without difficulty and without the need for any alterations within the controlled deflection roll 100.

According to a further embodiment of the controlled deflection roll 100, the dimensions, and specifically, the diameters of the inner roll shell part 8 and the outer roll shell part 9 are selected such, or the inner roll shell part 8 possess such a crowning or doming as generally indicated by reference numeral 45, that upon pressure relief there is already present a press or force fit. During normal operation of the controlled deflection roll 100 there is thus not required any excess or over pressure within the controlled deflection roll 100, and the discharge of pressurized fluid medium need not be throttled. Instead, in order to produce the play or clearance between the inner roll shell part 8 and the outer roll shell part 9 which is required for the replacement or exchange of the outer roll shell part 9, there is now generated a negative pressure within the controlled deflection roll 100. This negative pressure can be produced by connecting a vacuum pump 50 or the like at a predetermined line or conduit 52 of the controlled deflection roll 100. Hence, the inner roll shell part 8 now is retracted or radially inwardly moved by virtue of the pressure differential prevailing within the interior 30 of the controlled deflection roll 100 and the atmospheric pressure. Consequently, there is produced the play or clearance required for the dismantling and mounting, as the case may be, of the outer roll shell part 9 of the roll shell 2. Of course, with this embodiment, there are limited the clamping or engagement forces between the inner roll shell part 8 and the outer roll shell part 9 of the roll shell 2. However, for many fields of application the prevailing clamping forces are adequate. However, in this case, the inner roll shell part 8 must possess a certain radial tension force, for instance, by providing a certain crowning or doming of the inner roll shell part 8.

There is also possible a combination of the aforedescribed two embodiments, that is to say, during operation of the controlled deflection roll 100 there is generated an excess pressure within the controlled deflection roll 100, whereas for the exchange of the outer roll shell part 9 of the roll shell 2 there is generated a negative pressure within the controlled deflection roll 100.

While there are shown and described present preferred embodiments of the invention, it is distinctly to be understood the invention is not limited thereto, but may be otherwise variously embodied and practiced within the scope of the following claims.

What is claimed is:

1. A controlled deflection roll having a predetermined operating condition, comprising:

a stationary carrier means;

a roll shell;

means mounting the roll shell for rotational movement about the stationary carrier means;

at least one support element for bracing the roll shell against the stationary carrier means and exerting a pressing force at least in a predetermined support direction;

said roll shell comprising an inner roll shell part and an outer roll shell part;

the inner roll shell part and the outer roll shell part forming a press fit with respect to one another in the predetermined operating condition of the controlled deflection roll; and means for providing play between the inner roll shell part and the outer roll shell part to enable axial movement of the outer roll shell part in relation to the inner roll shell part during dismantling and exchange of the outer roll shell part of the roll shell.

2. The controlled deflection roll as defined in claim 1, wherein:

said means for providing play is achieved in that the inner roll shell part and the outer roll shell part of the roll shell in an unloaded state thereof, possess dimensions such that the inner roll shell part and the outer roll shell part possess said play with respect to one another sufficient to enable dismantling and mounting of the outer roll shell part; and means for producing within the controlled deflection roll, during the predetermined operation condition of the controlled deflection roll, an excess pressure sufficient to deform the inner roll shell part to such a degree that the inner roll shell part forms together with the outer roll shell part the press fit.

3. The controlled deflection roll as defined in claim 2, wherein:

said at least one support element comprises a plurality of hydraulic support elements;

means for supplying an hydraulic pressurized fluid medium to said plurality of hydraulic support elements; and said excess pressure producing means comprises hydraulic pressurized fluid medium departing from the hydraulic support elements during the predetermined operating condition of the controlled deflection roll.

4. The controlled deflection roll as defined in claim 3, further including:

a discharge line for the pressurized fluid medium;

a throttle valve provided for the discharge line; and said throttle valve, when actuated, hindering the outflow of pressurized fluid medium from the interior of the controlled deflection roll and causing the build-up of the excess pressure in the interior of the controlled deflection roll.

5. The controlled deflection roll as defined in claim 4, further including:

regulator means for controlling the throttle valve as a function of the pressure prevailing in the interior of the controlled deflection roll such that there is regulated a predetermined pressure in the interior of the controlled deflection roll.

6. The controlled deflection roll as defined in claim 1, wherein:

said means for providing play is achieved in that the inner roll shell part and the outer roll shell part of the roll shell possess dimensions such that the inner roll shell part and the outer roll shell part, without the action of further forces, form a press fit with respect to one another; and a negative pressure line connected with the interior of the controlled deflection roll for generating a negative pressure within the interior of the controlled deflection roll which is sufficient to deform the inner roll shell part of the roll shell to such a degree that there prevails between the inner roll shell part and the outer roll shell part said play which is sufficient for the dismantling and mounting of the outer roll shell part of the roll shell.

* * * * *